US012614161B1

(12) United States Patent
  Kirsh

(10) Patent No.: US 12,614,161 B1
(45) Date of Patent: Apr. 28, 2026

(54) RECOVERY OF DIGITAL ASSETS FROM A DECENTRALIZED CRYPTOGRAPHIC WALLET WITHOUT A PRIVATE KEY

(71) Applicant: DeSure Inc, Brooklyn, NY (US)

(72) Inventor: Yehuda Kirsh, Brooklyn, NY (US)

( * ) Notice: Subject to any disclaimer, the term of this patent is extended or adjusted under 35 U.S.C. 154(b) by 18 days.

(21) Appl. No.: 18/444,584

(22) Filed: Feb. 16, 2024

Related U.S. Application Data

(60) Provisional application No. 63/485,515, filed on Feb. 16, 2023.

(51) Int. Cl.
  *G06Q 20/10* (2012.01)
  *G06Q 20/36* (2012.01)
  *G06Q 20/38* (2012.01)
(52) U.S. Cl.
  CPC ........... *G06Q 20/10* (2013.01); *G06Q 20/367* (2013.01); *G06Q 20/389* (2013.01)
(58) Field of Classification Search
  CPC .............................. G06Q 20/10; G06Q 20/367
  USPC .......................................................... 705/65
  See application file for complete search history.

(56) References Cited

U.S. PATENT DOCUMENTS

| | | | | |
|---|---|---|---|---|
| 11,599,961 | B1* | 3/2023 | Foote ................. | G06Q 20/3829 |
| 2021/0327008 | A1* | 10/2021 | Salah .......................... | G06F 8/38 |
| 2022/0191035 | A1* | 6/2022 | Tucker .................. | H04L 63/123 |
| 2022/0309600 | A1* | 9/2022 | Quadros ................ | G06Q 10/10 |
| 2025/0013998 | A1* | 1/2025 | Ng .......................... | G06Q 20/02 |

* cited by examiner

*Primary Examiner* — Courtney P Jones
(74) *Attorney, Agent, or Firm* — Outside General Counsel, LLP; Alexander Franco

(57) ABSTRACT

A computer-implemented method allows an owner or beneficiary of a cryptographic wallet to recover digital assets from the wallet when access has been lost. Access is provided without compromising the security of the wallet or storing private keys of the wallet anywhere. The method relies on generating a set of commands, which extract digital assets from a "Source" wallet to a "Destination" wallet and signing these commands, but not publishing them to the blockchain until needed. When required, the beneficiary of these commands (the user himself in the "private key access lost" scenario, or user's heir in case of the user's death) can take these signed commands and publish them to the blockchain for execution.

13 Claims, 1 Drawing Sheet

100

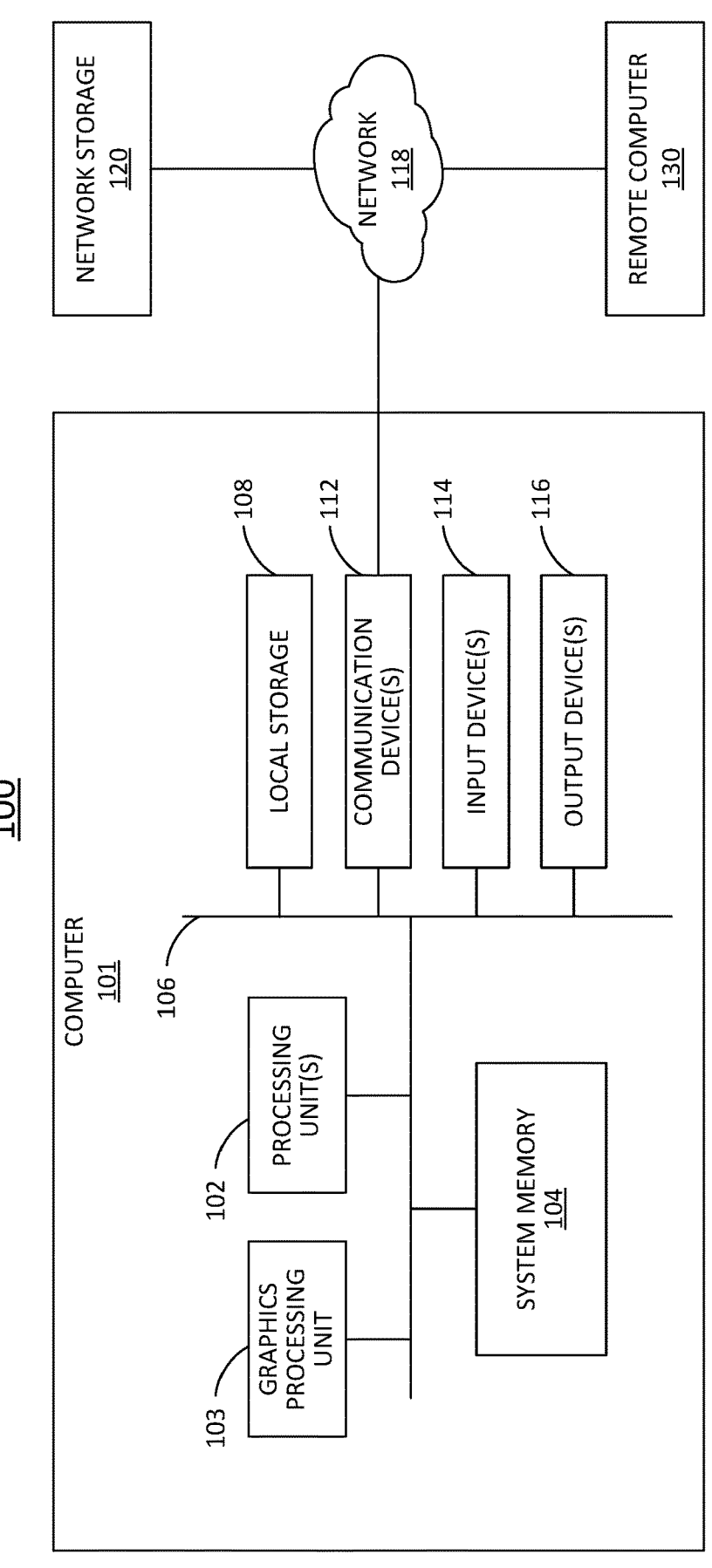

RECOVERY OF DIGITAL ASSETS FROM A DECENTRALIZED CRYPTOGRAPHIC WALLET WITHOUT A PRIVATE KEY

BACKGROUND OF THE INVENTION

"Memento Mori" is an old Latin phrase reminding us that our time on Earth is limited.

In an ordinary world, when a person passes away, all of his assets (including digital assets in his bank accounts) are going through inheritance procedure, during which beneficiaries (in most cases children and spouse) are determined and all assets and ownership rights are passed to them. Unfortunately, in a crypto world, applicability of standard inheritance procedures is quite limited, and is only possible for a limited number of assets which are stored under centralized control. This makes sense, as generally the only way to control digital assets on the blockchain wallet is to use a private key, which is unknown to any third party. Unfortunately, this brings additional risk to blockchain users, as their beneficiaries are not able to access digital assets stored on decentralized wallet if the owner of the wallet passes away. One of the solutions may be to share users' private key with his beneficiaries, but this brings another risk as these beneficiaries may misuse the private key (voluntary or involuntary—for example by losing their cell phone where the key is stored) and digital assets may be lost or some personal problems may arise in relationship between the user and his beneficiaries. The use of any third-party solution to store the private key of the user and disclose it to the beneficiaries when required, brings another risk of misbehavior of such third-party-which may use the stored private key to their advantage or may be hacked.

Quite similar logic is applicable to the scenarios when users lose access to their wallets by forgetting the private key. If this happens, the digital assets are frozen forever, and there is no way to recover them, unless the private key has been shared with others (which brings risks described above).

The system which allows to recover digital assets from the former wallet to a hardcoded wallet of the same user or his beneficiary, will help to solve both problems described above and will help with larger blockchain adoption.

SUMMARY OF THE INVENTION

A method can be performed by one or more computer systems. The method can include: identifying a source cryptographic wallet, the source wallet being associated with a blockchain and having a current nonce that increments with each subsequent command; identifying a target cryptographic wallet into which digital assets can be extracted from the source cryptographic wallet at a future date; creating a consecutive sequence of a plurality of future nonces, wherein a smallest of the future nonces is greater than the current nonce; identifying a set of one or more amounts of digital assets storable in the source wallet; generating and storing a plurality of signed commands by, for each nonce of the consecutive sequence of future nonces in combination with and in turn for each amount of the set of one or more amounts of digital assets: generating a signed command to extract the each amount from the source wallet to the target wallet, the signed command having the each nonce and the each amount; and storing the signed command without publishing the command to the blockchain; subsequent to the generating and storing the plurality of signed commands, receiving a request to recover digital assets from the source wallet to the target wallet; and in response to receiving the request: determining a new current nonce for the source wallet; determining an amount of digital assets in the source wallet; selecting from the stored signed commands a proper subset of the plurality of stored and signed commands having a set of sequential nonces starting at one greater than the new current nonce and having a sum total value substantially equal to but no greater than the amount of digital assets in the source wallet; and publishing the selected signed commands to the blockchain.

The set of one or more amounts of digital assets can include between 1 and 10 different amounts, between 2 and 8 different amounts, between 4 and 6 different amounts or more generally any number of different amounts preferably between 1 and 100.

A non-transitory computer readable medium can have instructions stored thereon, wherein the instructions are executed by the one or more computer systems and cause the one or more computer systems to perform the method.

As will be appreciated by one skilled in the art, multiple aspects described in this summary can be variously combined in different operable embodiments. All such operable combinations, though they may not be explicitly set forth in the interest of efficiency, are specifically contemplated by this disclosure.

BRIEF DESCRIPTION OF THE DRAWINGS

FIG. 1 illustrates a general computer architecture 100 that can be appropriately configured to implement components disclosed in accordance with various embodiments.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted. By way of example, this disclosure may set out a set or list of a number of options or possibilities for an embodiment, and in such case, this disclosure specifically contemplates all clearly feasible combinations and/or permutations of items in the set or list.

Solution

A set of software tools and methodologies, which allows to recover digital assets from the wallet access to which have been lost, without compromising the security of that wallet or storing private keys of that wallet anywhere.

The method relies on generating a set of "Extract" commands, which extract digital assets from the "Source" wallet to "Destination" wallet and signing these commands, but not sending them to the blockchain for processing until this is needed. When required, the beneficiary of these commands (the user himself in the "private key access lost" scenario, or user's heir in case of the user's death) can take these signed commands and publish them to blockchain for execution.

The "Extract" commands may be generated for different types of assets and different sums of these assets, including the cases when the user doesn't even have these assets in his wallet yet. This should help to generate one set of "Extract" commands when the user starts using his wallet, and prevent regenerating copies of these in the future, unless the sum of the digital assets in the wallet extends the planned amount.

It is assumed that in most cases the user will be defining his own "Destination" wallet, which is under centralized control, for example a CoinBase account. In that case, if digital assets access is lost—the user can extract these digital assets to such an account and then continue with what he was doing. If the user is deceased, beneficiaries can extract the digital assets to such an account, and then use standard CoinBase procedure to prove their right to be beneficiary of these digital assets and recover these.

The user may store these "Extract" commands on his computer, in his email, on some cloud storage like google drive, inside a commands storage system, or send these to his beneficiary. While it may be useful to ensure that these commands are secure and not available to everyone in the world, if these commands will suddenly be leaked and executed by someone who is not the user himself or his beneficiary, this will only cause minor inconvenience, as the user will receive these on his own "Beneficiary" wallet or their heir's "Beneficiary" wallet. It is not possible to adjust signed commands to extract digital assets to a different wallet than the one initially planned.

System takes into account current "nonce" of the user wallet and generates multiple commands with different "nonce" for that wallet, and multiple commands with different sum for that wallet. For example, if user wants to ensure that he can recover 50 ETH, and his current nonce is 200, commands generated will include:

1000 commands for 25 ETH with nonce from 201 to 1200

1000 commands for 12.5 ETH with nonce from 201 to 1200

1000 commands for 6.25 ETH with nonce from 201 to 1200

1000 commands for 3.125 ETH with nonce from 201 to 1200

1000 commands for 1.5625 ETH with nonce from 201 to 1200

1000 commands for 0.78125 ETH with nonce from 201 to 1200

1000 commands for 0.390625 ETH with nonce from 201 to 1200

1000 commands for 0.390625 ETH with nonce from 201 to 1200

Note that the total, which can be inherited, actually significantly surpasses original 50ETH planned, and some flexibility is given with regards to nonce. If a user executes 800 commands from his wallet, his "Extract" commands with nonce larger than current are still valid, he just needs to start using commands starting from nonce 200+800=1000. A notification system will take care of notifying the user in case if his nonce has grown too much and he has to generate a new set of "Extract" commands.

If in addition to this, the user wants to "recover/inherit" 100000 USDC, similar commands to recover these will be generated, where the first set would be half of the total sum, next one being the half of the previous one, and the last one will be repeating the sum twice.

The described solution works in Ethereum Virtual Machine (EVM) based systems right now-like Ethereum or Polygon.

When the user wants to recover the digital assets from the wallet, or when the user's beneficiary wants to recover digital assets from the wallet, they can take signed commands and combine them in a sequence which will only enumerate commands with:

Sequential nonce.

Nonce larger than the nonce of the last command signed from the wallet.

Sum which is as close to the sum available on the wallet as possible.

For example, imagine that a user has 57.032 ETH in his wallet at the time when recovery is required, and his last nonce was 800. This means to recover these digital assets the user or his beneficiary will need to send:

A command to extract 50 ETH with nonce 801

A command to extract 6.25 ETH with nonce 802

A command to extract 0.78125 ETH with nonce 803.

0.00075 ETH wouldn't be recoverable using the example defined above, but if required the minimum extractable sum can be lowered and recovery can go as deep, as it is profitable (i.e. when recovery is profitable from the gas fees perspective).

System Website User Interaction Flow

Commands generation system:

The User opens the website hosting the method

The User defines the type of assets he wants to be recovered (ETH, USDC, etc.)

The User defines the maximum sum of assets to be recovered

The User defines the address of the "Beneficiary" wallet—i.e. which wallet will receive these digital assets in case generated commands will be executed.

The User provides his private key or a seed phrase to sign the generated commands. The Private key is not extracted or stored anywhere and whole functionality is executed on the user's computer.

The System generates multiple commands for the user as described in the "Solution" section.

The User can choose to download these commands as a JSON file for further use or store inside the "Commands storage system"

Storing data inside the "Commands storage system" may be a paid feature which may require the user to pay a small fee.

The User, if he wants, can share his email/phone number, to receive notifications from the system in case he has more digital assets than it may be covered by the generated system, or his current nonce advanced too far away and he needs to repeat the commands to ensure full coverage.

A notification system may be a paid feature, which may require the user to pay a small fee.

Commands Storage System:

The User may choose to store generated commands inside the methods centralized database and define what information is required to access these. The options include:

The Person accessing has to know the wallet address of the user.

The Person accessing has to know the wallet address of the beneficiary.

The Person accessing has to know both the user's and the beneficiary's wallet addresses.

The User can also define some additional questions, which are being asked of the user, to ensure that access is rightful-such as the user's full name, date of birth or any specific information, which only he or his beneficiary knows.

The commands storage system, while checking for access, will ensure that brute force attacks are not possible and will limit the number of accesses for a given wallet address, so time needed to brute force hack the system will take thousands or even millions of years.

If a person is granted access to the command storage system to see "Extract" commands for a specific wallet, the only thing that person will have access to—is the same JSON file generated by the methods commands generation system.

Commands Execution System:

The commands execution system is a helper website, where the user can load JSON files generated in the methods commands generation system and select the commands to execute using an intuitive and easy to navigate interface. It is not necessary to use the methods commands execution system as long as the user has the access to JSON file with generated "Extract" commands, all of these commands the user can execute manually through code wallets, which allow to send signed commands, thus use of the methods commands execution system makes it more convenient.

Notification System:

The notification system will be sending notifications to the users through email and SMS in case the user's wallet is credited with more digital assets than it was signed in all still valid (i.e. with nonce larger than current) "Extract" commands. This will help to ensure the continuity of the inheritance/recovery procedure.

The protocol can also include the following.

The "Extract" commands may be moving digital assets to intermediate wallet, which will check for some preconditions and extract to the destination wallet only if these conditions are met (or return back to the original wallet if these are not met). For example, they may be checking one of the blockchain Oracles to read if there is a death certificate number loaded into blockchain for the person owning the wallet.

The "Extract" commands may be triggering some Smart-Contract behavior to ensure that digital assets, which are not currently in the wallet, are properly extracted. For example, if the user stakes his digital assets in some SmartContract, in the event of digital assets recovery, first it may be required to move digital assets out of the staking contract, and only after that they can be extracted to the Beneficiary's account.

The "Extract" commands may be interacting with some SmartContracts, which may be executing extract of multiple tokens (as long as the approval is given) in one go (to save on gas fees) or split extracted digital assets between multiple accounts (in case of multiple beneficiaries).

Long term the method is going to provide a functionality to embed logic described above into open source and commercial wallets, so users wouldn't need to execute any additional steps and can just define their "recovery/inheritance" wallet address at the moment when a wallet is created and get the functionality to recover/inherit these digital assets right inside such wallet application. The logic may even include generating "Extract" command on the go in such case, so each time when user's wallet is credited with the digital assets, the wallet application will ask user to sign "Extract" commands, ensuring that user is always secure and safe.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software can be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

FIG. 1 illustrates a general computer architecture 100 that can be appropriately configured to implement components disclosed in accordance with various embodiments. The computing architecture 100 can include various common computing elements, such as a computer 101, a network 118, and one or more remote computers 130. The embodiments disclosed herein, however, are not limited to implementation by the general computing architecture 100.

Referring to FIG. 1, the computer 101 can be any of a variety of general purpose computers such as, for example, a server, a desktop computer, a laptop computer, a tablet computer or a mobile computing device. The computer 101 can include a processing unit 102, a system memory 104 and a system bus 106.

The processing unit 102 can be or include one or more of any of various commercially available computer processors, which can each include one or more processing cores that can operate independently of each other. Additional co-processing units, such as a graphics processing unit 103, also can be present in the computer.

The system memory 104 can include volatile devices, such as dynamic random access memory (DRAM) or other random access memory devices. The system memory 104 can also or alternatively include non-volatile devices, such as a read-only memory or flash memory.

The computer 101 can include local non-volatile secondary storage 108 such as a disk drive, solid state disk, or removable memory card. The local storage 108 can include one or more removable and/or non-removable storage units. The local storage 108 can be used to store an operating system that initiates and manages various applications that execute on the computer. The local storage 108 can also be used to store special purpose software configured to implement the components of the embodiments disclosed herein and that can be executed as one or more applications under the operating system.

The computer 101 can also include communication device(s) 112 through which the computer communicates with other devices, such as one or more remote computers 130, over wired and/or wireless computer networks 118. Communications device(s) 112 can include, for example, a network interface for communicating data over a wired computer network. The communication device(s) 112 can include, for example, one or more radio transmitters for communications over Wi-Fi, Bluetooth, and/or mobile telephone networks.

The computer 101 can also access network storage 120 through the computer network 118. The network storage can include, for example, a network attached storage device located on a local network, or cloud-based storage hosted at one or more remote data centers. The operating system and/or special purpose software can alternatively be stored in the network storage 120.

The computer 101 can have various input device(s) 114 such as a keyboard, mouse, touchscreen, camera, microphone, accelerometer, thermometer, magnetometer, or any other sensor. Output device(s) 116 such as a display, speakers, printer, or eccentric rotating mass vibration motor can also be included.

The various storage 108, communication device(s) 112, output devices 116 and input devices 114 can be integrated within a housing of the computer, or can be connected through various input/output interface devices on the computer, in which case the reference numbers 108, 112, 114 and 116 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (AS- SPs), System-on-a-chip systems (SOCs), and Complex Programmable Logic Devices (CPLDs).

Although the subject matter has been described in terms of certain embodiments, other embodiments that may or may not provide various features and aspects set forth herein shall be understood to be contemplated by this disclosure. The specific embodiments set forth herein are disclosed as examples only, and the scope of the patented subject matter is defined by the claims that follow.

The invention claimed is:

1. A method performed by one or more computer systems, the method comprising, the one or more computer systems:

identifying a source cryptographic wallet, the source wallet being associated with a blockchain and having a current nonce that increments with each subsequent command;

identifying a target cryptographic wallet into which digital assets can be extracted from the source cryptographic wallet at a future date;

creating a consecutive sequence of a plurality of future nonces, wherein a smallest of the future nonces is greater than the current nonce;

identifying a set of one or more amounts of digital assets storable in the source wallet;

generating and storing a plurality of signed commands by, for each nonce of the consecutive sequence of future nonces in combination with and in turn for each amount of the set of one or more amounts of digital assets:

generating a signed command to extract the each amount from the source wallet to the target wallet, the signed command having the each nonce and the each amount; and storing the signed command without publishing the command to the blockchain;

subsequent to the generating and storing the plurality of signed commands, receiving a request to recover digital assets from the source wallet to the target wallet; and in response to receiving the request:

determining a new current nonce for the source wallet;

determining an amount of digital assets in the source wallet;

selecting from the stored signed commands a proper subset of the plurality of stored and signed commands having a set of sequential nonces starting at one greater than the new current nonce and having a sum total value substantially equal to but no greater than the amount of digital assets in the source wallet; and publishing the selected signed commands to the blockchain.

2. The method of claim 1, wherein the set of one or more amounts of digital assets consists of between 1 and 10 different amounts.

3. The method of claim 1, wherein the set of one or more amounts of digital assets consists of between 2 and 8 different amounts.

4. The method of claim 1, wherein the set of one or more amounts of digital assets consists of between 4 and 6 different amounts.

5. A set of one or more computer systems that perform the method of claim 1.

6. A non-transitory computer readable medium having instructions stored thereon, wherein the instructions are executed by the one or more computer systems and cause the one or more computer systems to perform the method of claim 1.

7. A method performed by one or more computer systems, the method comprising, the one or more computer systems:

identifying a source cryptographic wallet, the source wallet being associated with a blockchain and having a current nonce;

identifying a target cryptographic wallet into which digital assets can be extracted from the source cryptographic wallet at a future date;

creating a plurality of future nonces;

identifying a set of one or more amounts of digital assets storable in the source wallet;

generating and storing a plurality of signed commands by, for each nonce of the plurality of future nonces in combination with and in turn for each amount of the set of one or more amounts of digital assets:

generating a signed command to extract the each amount from the source wallet to the target wallet, the signed command having the each nonce and the each amount; and storing the signed command without publishing the command to the blockchain;

subsequent to the generating and storing the plurality of signed commands, receiving a request to recover digital assets from the source wallet to the target wallet; and in response to receiving the request:

determining a new current nonce for the source wallet;

determining an amount of digital assets in the source wallet;

selecting from the stored signed commands a proper subset of the plurality of stored and signed commands having a sum total value substantially equal to but no greater than the amount of digital assets in the source wallet; and publishing the selected signed commands to the blockchain.

8. The method of claim 7, wherein the set of one or more amounts of digital assets consists of between 1 and 10 different amounts.

9. The method of claim 7, wherein the set of one or more amounts of digital assets consists of between 2 and 8 different amounts.

10. The method of claim 7, wherein the set of one or more amounts of digital assets consists of between 4 and 6 different amounts.

11. The method of claim 7, wherein the plurality of future nonces is a consecutive sequence, wherein a smallest of the plurality of future nonces is greater than the current nonce, and wherein the proper subset of the plurality of stored and signed commands further have a set of sequential nonces starting at one greater than the new current nonce.

12. A set of one or more computer systems that perform the method of claim 7.

13. A non-transitory computer readable medium having instructions stored thereon, wherein the instructions are executed by the one or more computer systems and cause the one or more computer systems to perform the method of claim 7.

* * * * *